(12) United States Patent
    Crouch-Baker et al.

(10) Patent No.: US 12,686,778 B2
(45) Date of Patent: Jul. 21, 2026

(54) TRANSPARENT CONDUCTIVE OXIDE PARTICLES AND METHODS RELATED THERETO

(71) Applicant: SRI International, Menlo Park, CA (US)

(72) Inventors: Steven Crouch-Baker, Palo Alto, CA (US); Brian Slovick, San Mateo, CA (US); Albert Hirschon, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 34 days.

(21) Appl. No.: 18/666,078

(22) Filed: May 16, 2024

(65) Prior Publication Data

US 2024/0384117 A1     Nov. 21, 2024

Related U.S. Application Data

(60) Provisional application No. 63/467,119, filed on May 17, 2023.

(51) Int. Cl.
    *C09D 7/61*      (2018.01)
    *C01G 19/02*     (2006.01)
    *C09D 5/24*      (2006.01)
    *C09D 5/33*      (2006.01)
    (Continued)

(52) U.S. Cl.
    CPC .............. *C09D 7/61* (2018.01); *C01G 19/02* (2013.01); *C09D 5/004* (2013.01); *C09D 5/24* (2013.01); *C09D 133/12* (2013.01); *C01P 2004/62* (2013.01); *C01P 2006/40* (2013.01); *C08K 2003/2231* (2013.01); *C08K 2201/001* (2013.01); *C08K 2201/003* (2013.01)

(58) Field of Classification Search
    CPC . C09D 7/61; C09D 5/004; C09D 5/24; C09D 133/12; C01G 19/02; C01G 9/02; C01P 2004/62; C01P 2006/40; C08K 2003/2231; C08K 2201/001; C08K 2201/003
    See application file for complete search history.

(56) References Cited

PUBLICATIONS

Wang, Z. et al., "Transparent Conductive Oxides and Their Applications in Near Infrared Plasmonics," Phys. Status Solidi A 2019, 216, 1700794 (Year: 2019).*

(Continued)

*Primary Examiner* — Mark Kopec
*Assistant Examiner* — Jaison P Thomas
(74) *Attorney, Agent, or Firm* — Dicke, Billig & Czaja, PLLC

(57)     ABSTRACT

Examples are directed a plurality of particles comprising transparent conductive oxide particles. Example transparent conductive oxide particles have a median diameter of about 200 nanometer (nm) to about 500 nm in the particle size distribution, and a plasma wavelength of about less than 2000 nm. Additionally, the transparent conductive oxide particles may comprise a primary component and about 2 weight percent to about 20 weight percent of a secondary component. Also disclosed are methods of producing a plurality of particles comprising transparent conductive oxide particles and compositions comprising a plurality of particles comprising transparent conductive oxide particles and a binder.

18 Claims, 5 Drawing Sheets

(51) Int. Cl.
    C09D 133/12       (2006.01)
    C08K 3/22        (2006.01)

(56)           References Cited

PUBLICATIONS

Kanehara, M. et al., "Indium Tin Oxide Nanoparticles with Compositionally Tunable Surface Plasmon Resonance Frequencies in the Near-IR Region," J. Am. Chem. Soc. 2009, 131, 17736-17737 (Year: 2009).*
Akdağ et al., "Structural and Morphological Properties of Al doped ZnO Nanoparticles", Journal of Physics: Conference Series 707(012020), Int'l Physics Conference at the Anatolian Pek, Erzurum, Turkey, pp. 1-6 (Feb. 25-27, 2016).
Alkahlout et al., "Synthesis and Characterization of Aluminum Doped Zinc Oxide Nanostructures via Hydrothermal Route", Journal of Materials, 2014(235638): 1-8 (Mar. 25, 2014).
Buonsanti et al., "Tunable Infrared Absorption and Visible Transparency of Colloidal Aluminum-Doped Zinc Oxide Nanocrystals", Nano letters, 11(11):4706-4710 (Nov. 9, 2011).
Delacy et al., "Controlling the morphology of indium tin oxide using PEG-assisted hydrothermal synthesis", Materials Letters, 117:108-111 (Feb. 15, 2014). (Abstract and Introduction).
Gilstrap, Jr et al., "Synthesis of a Nonagglomerated Indium Tin Oxide Nanoparticle Dispersion", Advanced Materials, 20(21):4163-4166 (Sep. 2008).
Kanehara et al., "Indium Tin Oxide Nanoparticles with Compositionally Tunable Surface Plasmon Resonance Frequencies in the Near-IR Region", Journal of the American Chemical Society, 131(49):17736-17737 (Nov. 18, 2009).
Khan et al., "Synthesis and characterization of AI Doped ZnO Nanoparticles", International Journal of Modern Physics: Conference Series, 22:630-636 (2013).
Kim et al., "High Mobility in Nanocrystal-Based Transparent Conducting Oxide Thin Films", ACS Nano, 12(4):3200-3208 (Mar. 19, 2018). (Abstract).
Lee et al., "Solvent effects on synthesis of indium tin oxide nano-powders by solvothermal process", Journal of the European Ceramic Society, 25(14):3307-3314 (Sep. 2005).
Liu et al., "One-step hydrothermal synthesis and optical properties of aluminium doped ZnO hexagonal nanoplates on a zinc substrate", CrystEngComm, 13(5):1283-1286 (2011).

Manafi et al., "Synthesis and characterization of indium tin oxide nanoparticles via reflux method", Materials Science- Poland, 35(4):799-805 (Dec. 2017).
Miyazaki et al., "Design of ITO/transparent resin optically selective transparent composite", Solar Energy materials and Solar Cells, 79(1):51-55 (Aug. 2003).
Müller et al., "Highly Conducting Nanosized Monodispersed Antimony-Doped Tin Oxide Particles Synthesized via Nonaqueous Sol-Gel Procedure", Chemistry of Materials, 21(21):5229-5236 (Oct. 16, 2009). (Abstract).
Ogi et al., "Direct synthesis of highly crystalline transparent conducting oxide nanoparticles by low pressure spray pyrolysis", Advanced Powder Technology, 20(2):203-209 (Mar. 1, 2009).
Serier et al., "Al-doped ZnO powder materials: Al solubility limit and IR absorption properties", Solid State Sciences, 11(7):1192-1197 (Jul. 1, 2009).
Strachowski et al., "Morphology and luminescence properties of zinc oxide nanopowders doped with aluminum ions obtained by hydrothermal and vapor condensation methods", Journal of Applied Physics, 102(073513):1-9 (Oct. 9, 2007).
Suwanboon et al., "Structural and optical properties of undoped and aluminium doped zinc oxide nanoparticles via precipitation method at low temperature", Journal of Alloys and Compounds, 462(1-2):335-339 (Aug. 25, 2008).
Udawatte et al., "Fabrication of Low-Porosity Indium Tin Oxide Ceramics in Air from Hydrothermally Prepared Powder", Communications of the American Ceramic Society, 84(1):251-253 (Jan. 2001).
Wang et al., "Infrared emission characteristic and microwave loss property of aluminum doped zinc oxide nanoparticles", Ceramics International, 47(2):2456-2462 (Jan. 15, 2021). (Abstract and Introduction).
Xu et al., "Synthesis of tin-doped indium oxide nanoparticles by an ion-exchange and hydrothermal process", Materials Lettersm 60(7):983-985 (Apr. 2006).
Zhang et al., "Optical and electrical properties of aluminum-doped zinc oxide nanoparticles", Journal of Materials Science, 46:774-780 (2011).
Kanie et al., "Quaternary Ammonium Hydroxide-assisted Solvothermal Synthesis of Monodispersed ITO Nanoparticles with a Cubic Shape", Chemistry Letters, 42(7):738-740 (May 28, 2013). (Resubmitting as Legible Copy).

* cited by examiner

220

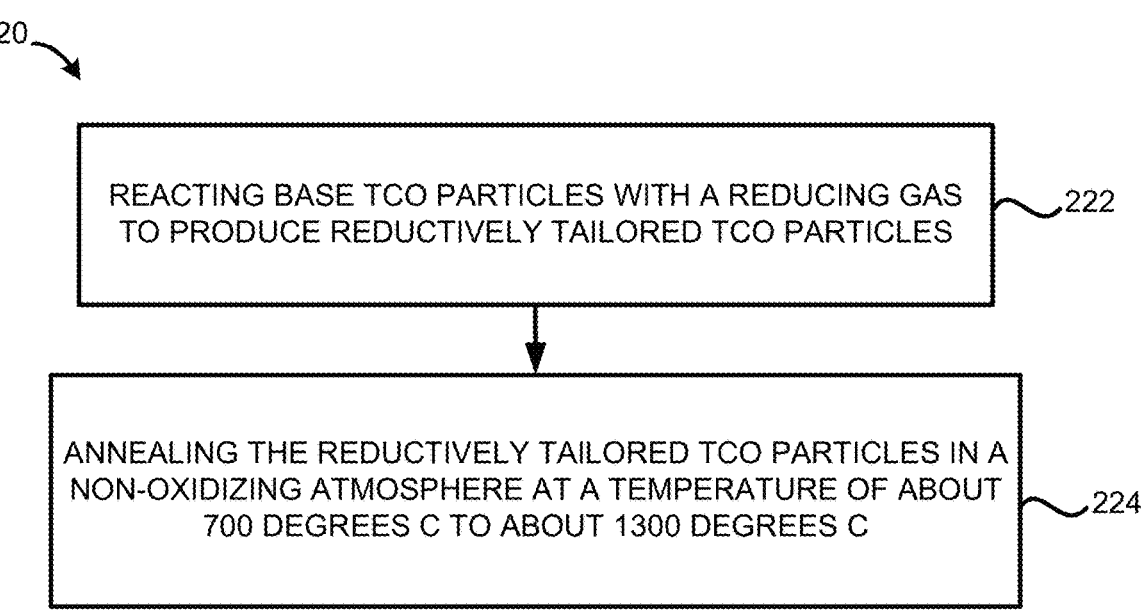

REACTING BASE TCO PARTICLES WITH A REDUCING GAS TO PRODUCE REDUCTIVELY TAILORED TCO PARTICLES ~222

ANNEALING THE REDUCTIVELY TAILORED TCO PARTICLES IN A NON-OXIDIZING ATMOSPHERE AT A TEMPERATURE OF ABOUT 700 DEGREES C TO ABOUT 1300 DEGREES C ~224

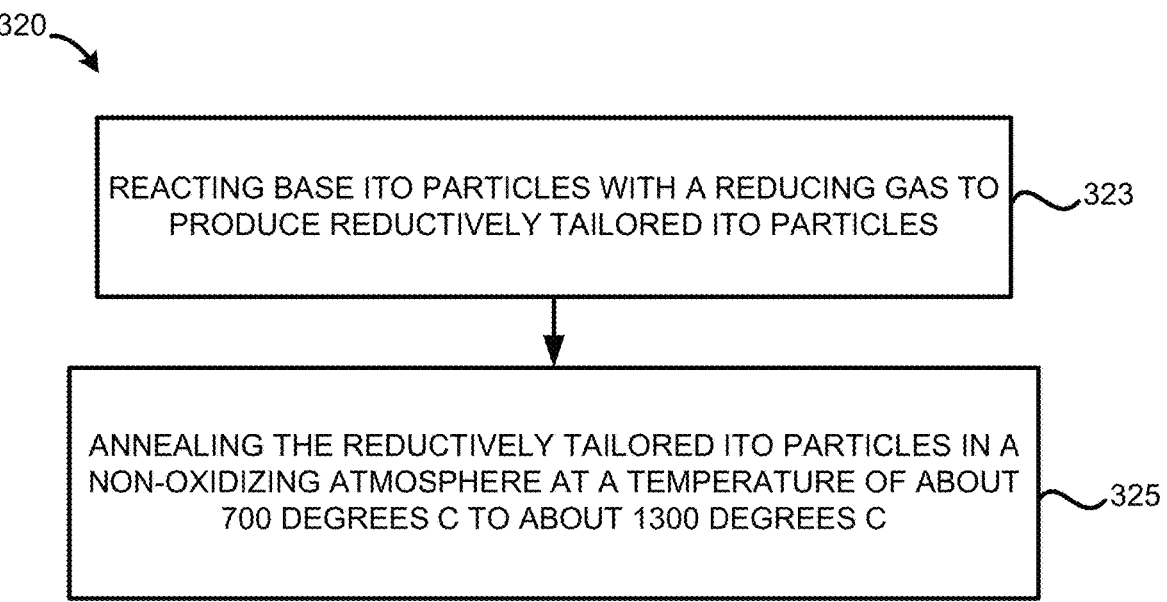

REACTING BASE ITO PARTICLES WITH A REDUCING GAS TO PRODUCE REDUCTIVELY TAILORED ITO PARTICLES ~323

ANNEALING THE REDUCTIVELY TAILORED ITO PARTICLES IN A NON-OXIDIZING ATMOSPHERE AT A TEMPERATURE OF ABOUT 700 DEGREES C TO ABOUT 1300 DEGREES C ~325

FIG. 3

TRANSPARENT CONDUCTIVE OXIDE PARTICLES AND METHODS RELATED THERETO

CROSS REFERENCE TO RELATED PATENT APPLICATIONS

This application claims priority to U.S. Provisional Application No. 63/467,119, filed on May 17, 2023, which is incorporated herein by reference in its entirety.

BACKGROUND

Transparent compositions that reflect near infrared light are useful for a variety of applications, for example paint coatings for use in autonomous vehicles. An autonomous vehicle is a vehicle that is capable of sensing its environment and navigating with little or no user input. Autonomous vehicles are capable of navigating the environment through use of sensors which can utilize Radio Detection and Ranging (RADAR), Light Detection and Ranging (LIDAR), or image sensors. Autonomous vehicles also use information from global positioning systems (GPS) technology, navigation systems, vehicle-to-vehicle communication, vehicle-to-infrastructure technology, and drive-by-wire systems to navigate and perform other tasks.

The paint coatings used for these autonomous vehicles can be crucial to the types and variety of sensors that allow vehicle-to-vehicle communication, detect obstacles, and determine where the road is. LIDAR sensors, a particular type of sensor, use emitted light pulses, typically around 905 nanometers (nm) to detect objects in the surroundings and effectively create a map for the course of the vehicle. Paint colors that reflect light at around 905 nm may be more easily detected by LIDAR. For example, a black car which reflects back significantly less near infrared signal than a white car may be functionally "less visible" on the road. Thus, paint coatings which enable and enhance reflectivity of the paint at LIDAR wavelengths, while not affecting the appearance, can be useful.

A transparent paint coating allows the underlying paint to be any type of paint, such as a vehicle paint and including conventional car paints. A transparent paint coating that reflects infrared light can enhance the signal detected by systems, e.g., LIDAR sensors, regardless of the paint color or type used as the base coat underneath the transparent paint coating. For such example applications, compositions which can be tailored to be reflective in the infrared range.

Thus, there is a need for a plurality of particles having a suitable plasma wavelength. For example, the composition can be a transparent paint composition comprising particles which exhibit both reflective and dielectric properties. Such particles, composition, and methods related thereto are disclosed herein.

BRIEF DESCRIPTION OF THE DRAWINGS

FIG. 2 illustrates an example method for forming a plurality of particles, in accordance with various examples.

FIG. 3 illustrates an example method for forming a plurality of indium tin oxide particles, in accordance with various examples.

DETAILED DESCRIPTION

Figure 1:
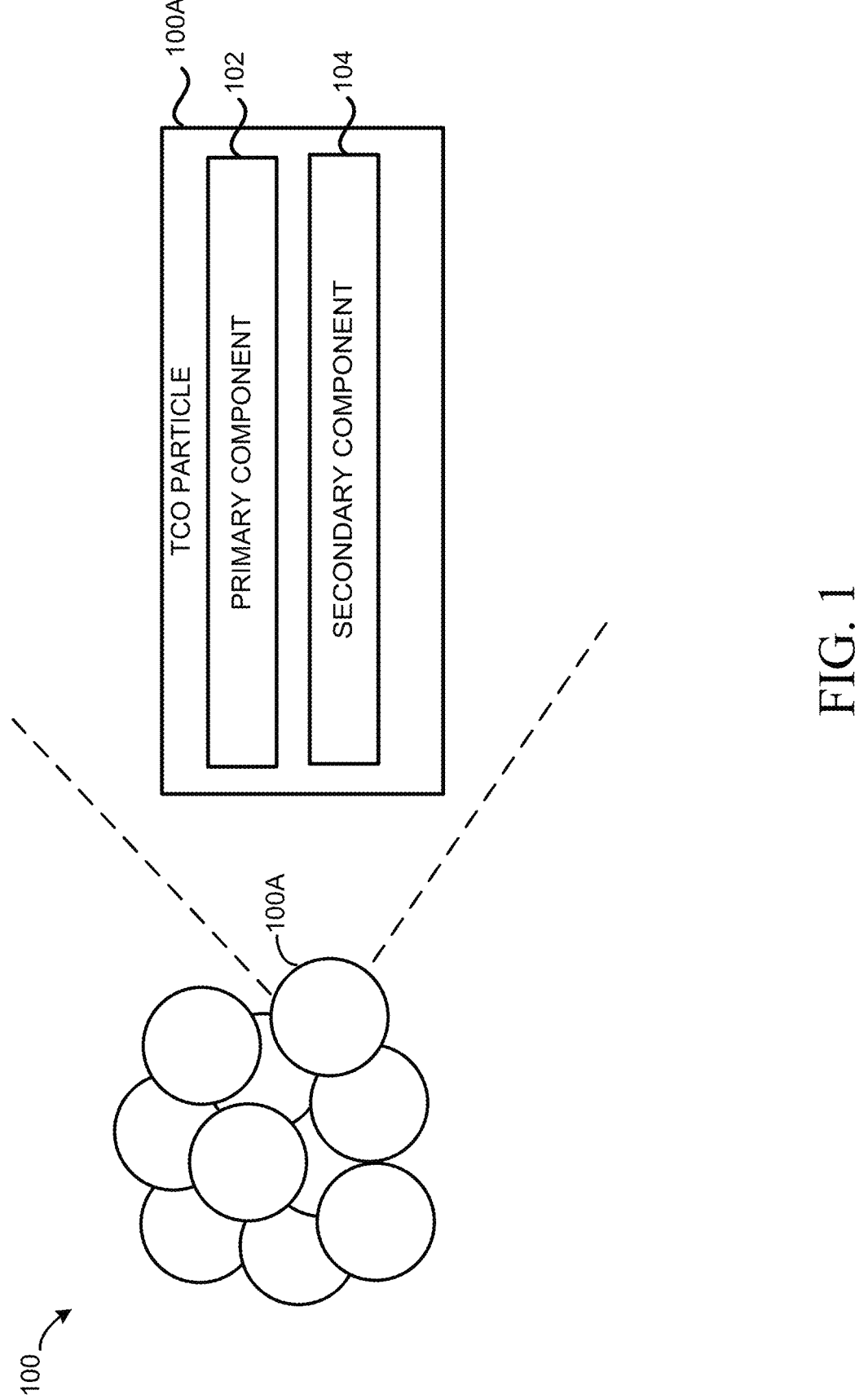
FIG. 1 illustrates an example of a plurality of particles, in accordance with various examples.

In the following detailed description, reference is made to the accompanying drawings that form a part hereof, and in which is shown, by way of illustration, specific examples. In the drawings, like reference numerals describe substantially similar components throughout the several views. Other examples may be utilized and structural, logical, physical and electrical changes may be made without departing from the scope of the present disclosure. The following detailed description is, therefore, not to be taken in a limiting sense.

Before the present particles, compositions, articles, systems, devices, and/or methods are disclosed and described, it is to be understood that the examples are not limited to specific methods unless otherwise specified, or to particular components or particles unless otherwise specified, as such may vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

As used herein, nomenclature for compounds can be given using common names as well as names assigned by the International Union of Pure and Applied Chemistry (IUPAC), Chemical Abstracts Service (CAS) recommendations for nomenclature, hereby incorporated herein by reference. One of skill in the art can readily ascertain the structure of a compound and if given a name by systemic reduction of the compound structure using naming conventions.

As used in the specification and the appended claims, the singular forms "a," "an," and "the" include plural referents unless the context clearly dictates otherwise.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed. Furthermore, when "about" is utilized to describe a value, this refers to, includes, and/or encompasses variations (up to +/−10%) from the stated value.

References in the specification and concluding claims to parts by weight of a particular element or component denotes the weight relationship between the element or component and any other elements or components or article for which a part by weight is expressed. Thus, in a composition comprising 100 parts by weight of component X and from 9 to 40 parts by weight component Y, X and Y are present at a weight ratio of 100:9-40 or 1:0.09-0.4 and are present in such ratio regardless of whether additional components are contained in the composition. A weight percent (wt %) of a component, unless specifically stated to the contrary, is based on total weight of the formulation or composition in which the component is included in.

Additionally, references in the specification and claims to molar ratios of a particular element or component denotes the molar relationship between the element or component and any other elements or components in the composition or article for which a molar ratio is expressed. Thus, in a composition containing five moles of component X and two moles component Y, X and Y are present at a molar ratio of 5:2 or 5/2 or 2.5 and are present in such ratio regardless of whether additional components are contained in the composition.

As used herein, the terms "optional" or "optionally" means that a subsequently described event or circumstance can or cannot occur, and that the description includes instances where said event or circumstance occurs and instances where it does not.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow, plain meaning derived from grammatical organization or punctuation, and number or type of example described in the specification.

Disclosed are components to be used to make the particles and compositions disclosed herein as well as what to be used within the methods disclosed herein. These and other compounds are disclosed herein, and it is understood that when combinations, subsets, interactions, groups, etcetera, of these materials are disclosed that while specific reference of each various individual and collective combinations and permutation of these components cannot be explicitly disclosed, each is specifically contemplated and described herein. For example, if a particular transparent conducting oxide composition is disclosed and discussed and a number of modifications that can be made to a number of compounds including the compositions are discussed, specifically contemplated is each and every combination and permutation of the composition and modifications that are possible unless specifically indicated to the contrary. Thus, if a class of compounds A, B, and C are disclosed as well as a class of transparent conducting oxide compositions D, E, and F and an example of a particle or composition, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using transparent conducting oxide compositions. Thus, if there are a variety of additional steps that can be performed, it is understood that each of these additional steps can be performed with any specific example or combination of examples of the methods described herein.

FIG. 1 illustrates an example of a plurality of particles, in accordance with various examples. The plurality of particles 100 can be formed from transparent conducting oxides (TCO). TCO are conductive metal oxides, which generally are formed of a primary component 102 and a secondary component 104. One type of TCO includes indium tin oxide (ITO), which is a transparent conducting oxide that may be used due to its electrical conductivity, optical transparency, case with which it can be deposited as a thin film, and its chemical resistance to moisture. Other example TCOs include, but are not limited to, antimony tin oxide, fluorine tin oxide, aluminum zinc oxide, gallium zinc oxide, and indium zinc oxide. In various examples, synthesis of TCO particles allows for fine-tuning of properties of the TCO material, such as tailoring the plasma frequency of the particles to affect infrared reflectivity.

In various examples, the plurality of particles 100 may be mono-dispersed. In some examples, the plurality of particles 100 may be separate from one another (e.g., discrete), and in other examples, the plurality of particles 100, or portions thereof, may agglomerate into larger particles. In any such example, the properties of the plurality of particles 100, as further described below and which include physical, optical, and electrical properties, are with respect to individual particles.

In some examples, the plurality of particles 100 comprise TCO particles having a median diameter of about 200 nanometers (nm) to about 500 nm in the particle size distribution, and a plasma wavelength of about less than 2000 nm. As shown by the particular TCO particle 100A of FIG. 1, the TCO particles comprise the primary component 102 and about 2 wt % to about 20 wt % of the secondary component 104 based on a total wt % of the plurality of particles 100.

In some examples, the primary component 102 may comprise a metal, such as indium or zinc, which may be doped with the secondary component 104. As used herein, a primary component 102 refers to or includes a component present in the TCO particle 100A at a higher wt % than the secondary component 104, and may be referred to as a majority component of the particles 100. The secondary component 104 refers to or includes a component present in the TCO particle 100A at a lower wt % than the primary component 102, and may be referred to as a minority component of the particles 100. In some example, the secondary component 104 may be a dopant. In some examples, the secondary component 104 may be present at levels higher than dopants typically are. Example primary components 102 include indium or zinc, among other elements. Example secondary components 104 include tin, aluminum, gallium, antimony, or fluorine, among other elements. As may be appreciated, the plurality of particles 100, or portions thereof, may comprise tertiary component(s) and are not limited to the primary component 102 and the secondary component 104.

Median diameter is defined as the median particle diameter as determined on an equivalent spherical particle volume basis. Where the term median diameter is used, it is understood to describe the particle size of individual particles that divides the population in half such that 50% of the population (e.g., the plurality of particles 100) is greater than or less than this size. The median particle diameter is sometimes written as D50, D (0.50) or D[0.5] or similar. In some examples, at least about 90% of the particles 100 are within the disclosed size distribution ranges. In some examples, at least 99% of the particles 100 are within the disclosed size ranges. In some examples, the optical properties are determined by the size (e.g., diameter) (and composition) of the individual particles among the plurality of particles 100.

In some examples, the particles 100 can have a median diameter of about 200 nm to about 500 nm, about 200 nm to about 450 nm, about 200 to about 400 nm, about 200 nm to about 350 nm, about 200 nm to about 300 nm, about 200 nm to about 250 nm, about 250 nm to 500 nm, about 250 nm to about 450 nm, about 250 nm to about 400 nm, about 250 nm to about 350 nm, or about 250 nm to about 300 nm in the particle size distribution, among other ranges. In some examples, the particles 100 can have a median diameter of about 200 nm to 400 nm in the particle size distribution. In some examples, the particles 100 can have a median diameter of about 250 nm to 350 nm in the particle size distribution.

The level of the secondary component 104 in the TCO material is a factor that is related to the electrical and optical properties of conductive oxide. For example, ITO films with optimum tin doping have high light transparency within the visible light spectrum and low electrical resistivity. In some examples, the particles 100 can each comprise about 2 wt % to about 20 wt %, about 5 wt % to about 20 wt %, about 6 wt % to about 20 wt %, about 8 wt % to about 20 wt %, about 10 wt % to about 20 wt %, about 12 wt % to about 20 wt %, about 14 wt % to about 20 wt, about 15 wt % to about 20 wt %, about 17 wt % to about 20 wt %, about 2 wt % to about 15 wt %, about 2 wt % to about 13 wt %, about 2 wt % to about 10%, about 2 wt % to 8 wt %, about 2 wt % to 5 wt %, about 2 wt % to about 3 wt %, about 5 wt % to about 15 wt %, about 5 wt % to about 13 wt %, about 5 wt % to about 10 wt %, about 10 wt % to about 17 wt %, or about 10 wt % to about 15 wt % of the secondary component, among other ranges. In some examples, the particles 100 each comprise a wt % of about 8% to about 20% of the secondary component 104, such as tin. In some examples, the particles 100 each comprise about 10 wt % to about 20 wt % or about 10 wt % to about 15 wt % of the secondary component 104, among other wt %. As a non-limiting example, a secondary component 104 of tin may be present in the particles 100 at about 5 wt % to about 20 wt %, about 8 wt % to about 20 wt %, about 10 wt % to about 20 wt %, or about 10 wt % to about 15 wt %. As another non-limiting example, a secondary component 104 of gallium or antimony may be present in the particles 100 at about 2 wt % to about 20 wt %, about 2 wt % to about 10 wt %, about 2 wt % to about 5 wt %, or about 2 wt % to about 3 wt %.

In some examples, the level of the secondary component 104 present in the TCO material can impact the electrical and optical properties as follows. As more secondary component 104 is added (e.g., tin to indium oxide), more free electrons are created which makes the material conductive. A more conductive material may exhibit plasma frequency at relatively lower wavelengths, such as within the below listed example plasma wavelength of about less than 2000 nm. There is a limit to this process (e.g., more electrons are created, but the electrons are not free). In some examples, and as further described in connection with at least FIGS. 2-3, additional free electrons are generated by reducing the TCO material under hydrogen (or other gas) to remove oxygen and create oxygen vacancies. By reducing the TCO material, the transition between reflecting wavelengths and transparency may occur at short wavelengths (e.g., plasma wavelength of less than 2000 nm), such that the resulting particles 100 reflect infrared wavelengths and are transparent at visible light wavelengths as further described below. The wavelength the transition occurs at is sometimes referred herein to as the "plasma wavelength". Other factors that may be related to (e.g., impact) the electrical and optical properties of TCO particles include oxygen vacancy and crystal structure, among others.

In some examples, the particles 100 can be reflective in the infrared wavelength range and exhibit dielectric properties in the visible wavelength range. As referenced herein, the infrared wavelength range is from about 750 nm to 1 millimeter (mm) in the electromagnetic spectrum. The visible wavelength range is from about 380 nm to 750 nm in the electromagnetic spectrum.

The plasma wavelength of a material is inversely related to the plasma frequency. The plasma frequency of a material $\omega_p$ is determined by the formula:

$$\omega_p^2 = \frac{e^2 N_C}{m * \varepsilon_0},$$

where $N_C$ is the concentration of free carriers, $m^*$ is the effective free-electron mass, $e$ is the electron charge, and $\varepsilon_0 = 8.854 \times 10^{-12}$ (F/m) is the free-space permittivity. In the case of ITO, the concentration of free carriers $N_C$ is dependent on the doping level of tin as mentioned above and on the oxygen content. Thus, the plasma frequency, and consequently the plasma wavelength of the TCO particle (e.g., 100A), can be tailored by altering the level of the secondary component 104 and variation of the oxygen content in the material. As further described below, the oxygen content can be varied by reducing the TCO material forming the plurality of particles 100. Reduction of particles, for example, increases the concentration $N_C$ of carriers, which reduces the plasma wavelength to less than 2000 nm. Typical values for the plasma wavelength of conventionally prepared TCO particles range from about 2000 nm to 3000 nm.

As disclosed herein, the particles 100 can have a plasma wavelength of about less than 2000 nm. The particles 100 can have a plasma wavelength of about less than 1900 nm, about less than 1800 nm, about less than 1700 nm, about less than 1600 nm, about less than 1500 nm, about less than 1400 nm, about less than 1300 nm, about less than 1200 nm, about less than 1100 nm, about less than 1000 nm, about less than 900 nm, or about less than 800 nm, among other values. In some examples, the particles 100 can have a plasma wavelength of about 1500 nm to about 1550 nm, about 1450 nm to about 1500 nm, about 1400 nm to about 1450 nm, about 1350 nm to about 1400 nm, about 1300 nm to about 1350 nm, about 1250 nm to about 1300 nm, about 1200 nm to about 1250 nm, about 1150 nm to about 1200 nm, about 1000 nm to about 1150 nm, about 950 nm to about 1000 nm, about 900 nm to about 980 nm, about 900 nm to about 950 nm, about 850 nm to about 900 nm, about 800 nm to about 850 nm, or about 750 nm to about 800 nm, among other values.

In some examples, the particles 100 have a refractive index of about 1.3 to 2.2. In some examples, the particles 100 have a refractive index of about 1.4 to 1.6. The refractive index may be an intrinsic, wavelength-dependent property of the TCO material.

The plurality of particles 100 comprising individual TCO particles (e.g., 100A) can be present in any state. In some examples, the plurality of particles 100 comprising individual TCO particles can be present, for example, as a powder, dispersed in a solution, or on a substrate.

Various examples are directed to a method of producing a plurality of particles. FIG. 2 illustrates an example method for forming a plurality of particles, in accordance with various examples. The method 220 can be used to produce the plurality of particles 100 as previously illustrated and described in connection with FIG. 1, in some examples.

As shown by FIG. 2, at 222, the method 220 may comprise reacting base TCO particles with a reducing gas to produce reductively tailored TCO particles. At 224, the method 220 may comprise annealing the reductively tailored TCO particles in a non-oxidizing atmosphere at a temperature of about 700 degrees Celsius (° C.) to 1300° C. to produce the plurality of particles comprising the TCO particles. "Reductively tailored TCO particles" or ITO particles, as used herein, refers to or includes TCO particles formed by controlling an amount of reduction based on a plasma frequency target. For example, the amount of reduction may be controlled by titrating an amount of the reducing gas, the temperature (e.g., reaction temperature), and/or the reaction time, and/or annealing at a threshold temperature (e.g., annealing temperature) under inert gases to provide a particular crystal structure. A "non-oxidizing atmosphere", as used herein, refers to or includes an atmosphere that does not alter the TCO composition to change the plasma frequencies to shorter wavelengths, such as argon or other inert gas.

The base TCO particles can be formed of a variety of material. In some examples, the base TCO particles are selected from ITO particles, antimony tin oxide particles, fluorine tin oxide particles, aluminum zinc oxide particles, gallium zinc oxide particles, and indium zinc oxide particles. In some examples, the base TCO are ITO particles.

In some examples, the base TCO particles are reacted with a reducing gas to produce reductively tailored TCO, at 224. As noted above, reduction of the particles increases the concentration $N_C$ of carriers, and in response, reduces the plasma wavelength. The reducing gas refers to or includes any gas composition capable of reducing the particles, including mixtures of gases. In some examples, the reducing gas comprises carbon monoxide, ammonia, hydrazine, $H_2$, or a combination thereof. In some examples, the reducing gas comprises $H_2$. In some examples, the reducing gas further comprises an inert gas selected from the group consisting of nitrogen, argon, helium, xenon, krypton, or a combination thereof. In some examples, the reducing gas further comprises argon.

In some examples, the reducing gas can be a mixture of $H_2$ in argon. In some examples, the reducing gas is a mixture of about 3% to about 20% $H_2$ in argon. In some examples, the reducing gas can be a mixture of about 3% to about 18% $H_2$ in argon, about 3% to about 15% $H_2$ in argon, about 3% to about 13% $H_2$ in argon, about 3% to about 10% $H_2$ in argon, about 3% to about 8% $H_2$ in argon, about 5% to about 20% $H_2$ in argon, about 5% to about 18% $H_2$ in argon, about 5% to about 15% $H_2$ in argon, about 5% to about 13% $H_2$ in argon, about 5% to about 10% $H_2$ in argon, about 5% to about 8% $H_2$ in argon, about 8% to about 20% $H_2$ in argon, about 8% to about 18% $H_2$ in argon, about 8% to about 15% $H_2$ in argon, about 8% to about 13% $H_2$ in argon, about 8% to about 10% $H_2$ in argon, about 10% to about 20% $H_2$ in argon, about 10% to about 18% $H_2$ in argon, or about 10% to about 15% $H_2$ in argon, among other percent values. Example are not limited to the above gases. For example, the reducing gas may be other gases and other mixtures.

In some examples, reacting the base TCO particles with the reducing gas, at 222, comprises removing oxygen from the base TCO particles using the reducing gas for about 20 minutes to about 3 hours and increasing from a room temperature to a temperature, herein sometimes referred to as "a reaction temperature" for ease of reference. In some examples, the TCO particles are reacted with the reducing gas for the about 20 minutes to about 3 hours prior to increasing from room temperature to the reaction temperature. For example, the oxygen may be removed using the reducing gas for a time period of about 30 minutes to about 3 hours, about 30 minutes to about 2.5 hours, about 30 minutes to about 2 hours, about 30 minutes to about 1.5 hours, about 30 minutes to about 1 hour, about 1 hour to about 3 hours, about 1 hour to about 2.5 hours, about 1 hour to about 2 hours, about 1 hour to about 1.5 hours, or about 2 hours to about 3 hours, among other time periods.

In various examples, reacting the base TCO particles with the reducing gas, at 222, comprises increasing from about room temperature to the reaction temperature of about 200° C. to about 500° C. over the time period of about 30 minutes to about 2 hours. In some examples, reacting the base TCO particles with the reducing gas comprises increasing from about room temperature to the (reaction) temperature of about 200° C. to about 450° C. over the time period of about 30 minutes to about 2 hours, from about room temperature to the (reaction) temperature of about 200° C. to about 400° C. over the time period of about 30 minutes to about 2 hours, from about room temperature to the (reaction) temperature of about 200° C. to about 300° C. over the time period of about 30 minutes to about 2 hours, from about room temperature to the (reaction) temperature of about 200° C. to about 500° C. over the time period of about 30 minutes to about 1 hour, from about room temperature to the (reaction) temperature of about 200° C. to about 450° C. over the time period of about 30 minutes to about 1 hour, from about room temperature to the (reaction) temperature of about 200° C. to about 400° C. over the time period of about 30 minutes to about 1 hour, or from about room temperature to the (reaction) temperature of about 200° C. to about 350° C. over the time of about 30 minutes to about 1 hour, among other values and ranges. In some examples, reacting the base TCO particles with a reducing gas comprises increasing the reaction temperature from about room temperature to about 200° C. to 300° C. over the time period of about 30 minutes to about 1 hour. Examples are not limited to the above described reaction temperatures and times. Various examples include removing oxygen at room temperature and reacting the base TCO particles with the reducing gas at or while heating up to the reaction temperature and for a period of time that does not impact the Drude effect. As may be appreciated, particular heating systems may be capable of different heating and cooling speeds, as well as temperatures, such that the reaction temperature and time may be adjusted.

Furthermore, in some examples, the reaction temperature is held from about 30 minutes to 1.5 hours. In some examples, the reaction temperature is held from about 30 minutes to 1 hour. In some examples, the reaction temperature is held at between about 250° C. and about 350° C. for about 30 minutes to about 1.5 hours. In some examples, the reaction temperature is held at about 250° C. to about 300° C. from about 30 minutes to about 1.5 hours. In some examples, the reaction temperature is held at about 250° C. to about 300° C. from about 30 minutes to 1 hour. Examples are not limited to the specific times and/or reaction temperatures, and may be adjusted for different heating systems. In some examples, the time that the reaction temperature is held may be used to increase the speed of the reduction.

In some examples, the reductively tailored TCO particles are cooled to about room temperature prior to annealing. Cooling to room temperature may be used to switch lines (e.g., to switch from the reducing gas to the non-oxidizing atmosphere) without exposing to air. However, in various examples, the reductively tailored TCO particles may not be cooled to about room temperature prior to annealing when using heating system(s) that include valving or other components which allow for preventing air exposure.

The annealing step, at 224, is a heat treatment process performed in a non-oxidizing atmosphere and may be used to remove defects from the crystals (e.g., flaws in the crystal structure). For example, the material may become more crystalline as defects are removed. In some examples, the temperature to anneal the reductively tailored TCO particles, sometimes herein referred to as the "annealing temperature" for ease of reference, is from about 700° C. to about 1300° C. For example, the temperature to anneal the reductively tailored TCO particles can be from about 850° C. to about 1150° C., from about 850° C. to about 1250° C., from about 900° C. to about 1200° C., from about 1000° C. to about 1150° C., from about 850° C. to about 1300° C., from about 850° C. to about 1200° C., from about 850° C. to 1150° C., from about 850° C. to about 1000° C., from about 850° C. to about 950° C., from about 850° C. to about 900° C., from about 900° C. to about 1300° C., about 900° C. to about 1250° C., from about 900° C. to about 1150° C., from about 900° C. to about 1000° C., from about 900° C. to about 1050° C., from about 900° C. to about 950° C., from about 1000° C. to about 1050° C., from about 1000° C. to about 1100° C., from about 1000° C. to about 1200° C., from about 1000° C. to about 1250° C., or from about 1000° C. to about 1200° C., among other ranges.

In some examples, annealing the reductively tailored TCO particles, at 224, comprises increasing from about room temperature to the annealing temperature (in the range) of about 700° C. to about 1300° C. and over the time period of about two hours to about five hours. In some examples, annealing the reductively tailored TCO particles comprises increasing from about room temperature to the annealing temperature of about 850° C. to about 1150° C. over the time period of about 2.5 hours to about 4 hours. In some examples, gradually increasing the temperature to the annealing temperature may prevent cracking. Examples are not limited to the specific times and/or annealing temperatures, and may be adjusted for different heating systems.

In some examples, annealing the reductively tailored TCO particles, at 224, comprises increasing from about room temperature to the annealing temperature of about 850° C. to about 1150° C., about 850° C. to about 1100° C., about 900° C. to about 1100° C., about 950° C. to about 1100° C., about 1000° C. to about 1100° C., or 1000° C. to about 1200° C., among other temperatures and/or ranges.

In some examples, annealing the reductively tailored TCO particles, at 224, comprises increasing a temperature to the annealing temperature over the time of about 2.5 hours to about 4 hours, about 2.5 hours to about 3.5 hours, about 2.5 hours to about 3 hours, about 3 hours to about 4 hours, or about 3 hours to about 3.5 hours, among other time periods.

In some examples, annealing the reductively tailored TCO particles comprises holding at the (annealing) temperature for about 0.5 hours to 4 hours. In some examples, annealing the reductively tailored TCO particles comprises holding at the (annealing) temperature for about 0.5 hours to about 3.5 hours, about 0.5 hours to about 3 hours, about 0.5 hours to about 2.5 hours, about 0.5 hours to about 2 hours, or about 0.5 hours to about 1.5 hours, among other time periods.

In various examples, the non-oxidizing atmosphere can comprise any gas or mixture of gases that forms a non-oxidizing atmosphere. In some examples, the non-oxidizing atmosphere comprises nitrogen, argon, helium, xenon, krypton, or a combination thereof. As may be appreciated, the non-oxidizing atmosphere is not limited to the listed gases and combinations thereof and may include various gases and combinations thereof.

In some examples, the method 220 further comprises cooling the plurality of particles comprising TCO particles to about room temperature after annealing.

Various examples are directed to a plurality of particles comprising TCO particles produced by the methods described above, such as those previously described in connection with at least FIG. 1. In some examples, the base TCO are selected from the group consisting of ITO particles, antimony tin oxide particles, fluorine tin oxide particles, aluminum zinc oxide particles, gallium zinc oxide particles, indium zinc oxide particles, or a combination thereof.

Some examples are directed to a method of producing a plurality of particles comprising ITO particles. FIG. 3 illustrates an example method for forming a plurality of ITO particles, in accordance with various examples.

As shown by FIG. 3, the method 320 may comprise reacting base ITO particles with a reducing gas to produce reductively tailored indium tin oxide particles, at 323, and annealing the reductively tailored ITO particles at a temperature of about 700° C. to about 1300° C. to produce the plurality of particles comprising ITO particles, at 325.

The base ITO particles can be prepared using conventional synthetic methods, such as, for example, the methods disclosed in Lee et al, "Solvent effects on synthesis of indium tin oxide nano-powders by solvothermal process", J. European Ceramic Soc. 25 (2005) 3307-3314, which is incorporated entirely herein by reference. In some examples, the base ITO particles are prepared with a molar ratio of about 7:1 to about 13:1 indium:tin. The base ITO particles can be prepared, for example, with a molar ratio of about 7:1 to about 12:1 indium:tin, about 7:1 to about 11:1 indium:tin, about 7:1 to about 10:1 indium:tin, about 8:1 to about 13:1 indium:tin, about 8:1 to about 12:1 indium:tin, 8:1 to about 11:1 indium:tin, about 8:1 to about 10:1 indium:tin, about 9:1 to about 13:1 indium:tin, about 9:1 to about 12:1 indium:tin, about 9:1 to about 11:1 indium:tin, or about 9:1 to about 10:1 indium:tin, among other molar ratios. Examples are directed to other types of TCOs, such as those described by FIGS. 1-2, may include the same of different molar ratios of primary components and secondary components.

In some examples, the preparation of the base ITO particles further comprises addition of a glycol. Examples of suitable glycols include, but are not limited to, glycerin, propylene glycol, butylene glycol, pentalene glycol, hexylene glycol, polyethylene glycol, polypropylene glycol, diethylene glycol, triethylene glycol, capryl glycol, glycerol, butanediol and hexanetriol, and copolymers or mixtures thereof. As may be appreciated, in some examples, the preparation of the base TCO particles, which may be formed of material other than ITO, may similarly comprise the addition of a glycol or other solvent that is stable at temperatures of the reaction in the method 220 of FIG. 2 or the method 320 of FIG. 3.

In some examples, the glycol is polyethylene glycol. In some examples, the polyethylene glycol has a molecular weight of about 300 to about 600 g/mol. For example, the polyethylene glycol can have a molecular weight of about 350 g/mol to about 500 g/mol, about 400 g/mol to about 500 g/mol, about 300 g/mol to about 450 g/mol, or about 300 g/mol to about 400 g/mol, among other molecular weights.

The base ITO particles can be prepared from any compounds comprising indium and tin. In one example, the base ITO particles are prepared from indium trichloride and tin tetrachloride. The base ITO particles can also be prepared from, for example, indium nitrate or from the reaction of indium metal from nitric acid. Alternative organometallic tin compounds such as tin acetate can also be used. As may be appreciated, the base TCO particles of the method 220 of FIG. 2 can be prepared using any compounds comprising the primary component and secondary component, and using synthetic routes which would be known to one of ordinary skill in the art.

In some examples, as described above, the base ITO particles are reacted with the reducing gas to produce reductively tailored ITO particles, at 323, as reduction of the particles increases the concentration $N_C$ of carriers, reducing the plasma wavelength. The reducing gas can be any gas composition capable of reducing the particles, including mixtures of gases. In some examples, the reducing gas comprises carbon monoxide, ammonia, hydrazine, $H_2$, or a combination thereof. In some examples, the reducing gas comprises $H_2$. In some examples, the reducing gas further comprises an inert gas selected from the group consisting of nitrogen, argon, helium, xenon, and krypton, or a combination thereof. In some examples, the reducing gas further comprises argon.

The reducing gas can be, for example, a mixture of $H_2$ in argon. In some examples, the reducing gas is a mixture of about 3% to about 20% $H_2$ in argon, about 3% to about 18% $H_2$ in argon, about 3% to about 15% $H_2$ in argon, about 3% to about 13% $H_2$ in argon, about 3% to about 10% $H_2$ in argon, about 3% to about 8% $H_2$ in argon, about 5% to about 20% $H_2$ in argon, about 5% to about 18% $H_2$ in argon, about 5% to about 15% $H_2$ in argon, about 5% to about 13% $H_2$ in argon, about 5% to about 10% $H_2$ in argon, about 5% to about 8% $H_2$ in argon, about 8% to about 20% $H_2$ in argon, about 8% to about 18% $H_2$ in argon, about 8% to about 15% $H_2$ in argon, about 8% to about 13% $H_2$ in argon, about 8% to about 10% $H_2$ in argon, about 10% to about 20% $H_2$ in argon, about 10% to about 18% $H_2$ in argon, or about 10% to about 15% $H_2$ in argon, among other values. As described above, reducing gases are not limited to hydrogen and argon, and may include mixtures of other gases.

In some examples, reacting the base ITO particles with a reducing gas, at 323, comprises removing oxygen from the base ITO particles, using a reducing gas for about 20 minutes to about 3 hours and prior to increasing from room temperature to the reaction temperature. For example, the oxygen may be removed using the reducing gas for a time period of about 30 minutes to about 3 hours, about 30 minutes to about 2.5 hours, about 30 minutes to about 2 hours, about 30 minutes to about 1.5 hours, about 30 minutes to about 1 hour, about 1 hour to about 3 hours, about 1 hour to about 2.5 hours, about 1 hour to about 2 hours, about 1 hour to about 1.5 hours, or about 2 hours to about 3 hours, among other time periods.

In some examples, reacting the base ITO particles with the reducing gas, at 323, comprises increasing from about room temperature to the reaction temperature of about 200° C. to about 500° C. over the time period of about 30 minutes to about 2 hours, about 200° C. to about 450° C. over the time of about 30 minutes to about 2 hours, about 200° C. to about 400° C. over the time of about 30 minutes to about 2 hours, about 200° C. to about 300° C. over the time of about 30 minutes to about 2 hours, about 200° C. to about 500° C. over the time period of about 30 minutes to about 1 hour, about 200° C. to about 450° C. over the time period of about 30 minutes to about 1 hour, about 200° C. to about 400° C. over the time period of about 30 minutes to ° C. 1 hour, about 200° C. to about 350° C. over the time period of about 30 minutes to about 1 hour, or about 200° C. to about 300° C. over the time of about 30 minutes to about 1 hour, among other temperatures and time periods.

In some examples, the reaction temperature is held for about 30 minutes to about 1.5 hours. For example, the reaction temperature can be held for about 30 minutes to about 1 hour. In some examples, the reaction temperature is held at about 250° C. to about 350° C. and for about 30 minutes to about 1.5 hours, at about 250° C. to about 300° C. and for about 30 minutes to about 1.5 hours, or at about 250° C. to about 300° C. and for about 30 minutes to about 1 hour, among other time periods and/or temperatures.

In some examples, the reductively tailored ITO particles are cooled to about room temperature prior to annealing.

The annealing step, at 325, is a heat treatment process performed in a non-oxidizing atmosphere and may be used to remove defects from the crystals. In some examples, the temperature to anneal the reductively tailored ITO particles, e.g., the annealing temperature, is from about 700° C. to about 1300° C. For example, the temperature to anneal the reductively tailored ITO particles can be from about 850° C. to about 1150° C., about 850° C. to about 1250° C., about 900° C. to about 1200° C., about 1000° C. to about 1150° C., about 850° C. to about 1300° C., about 850° C. to about 1200° C., about 850° C. to about 1150° C., about 850° C. to about 1000° C., about 850° C. to about 950° C., about 850° C. to about 900° C., about 900° C. to about 1300° C., about 900° C. to about 1250° C., 900° C. to about 1150° C., about 900° C. to about 1000° C., about 900° C. to about 1050° C., about 900° C. to about 950° C., about 1000° C. to about 1050° C., about 1000° C. to about 1100° C., about 1000° C. to about 1200° C., about 1000° C. to about 1250° C., or about 1000° C. to about 1200° C., among other temperatures.

In some examples, annealing the reductively tailored ITO particles, at 325, comprises increasing from about room temperature to the annealing temperature (in the range) of about 700° C. to about 1300° C. and over the time period of about two hours to about five hours. In some examples, annealing the reductively tailored ITO particles comprises increasing from about room temperature to the (annealing) temperature of about 850° C. to about 1150° C. and over the time period of about 2.5 hours to about 4 hours.

In some examples, annealing the reductively tailored ITO particles comprises increasing from about room temperature to the (annealing) temperature of about 850° C. to about 1150° C., about 850° C. to about 1100° C., about 900° C. to about 1100° C., about 950° C. to about 1100° C., or about 1000° C. to about 1100° C., among other temperatures.

In some examples, annealing the reductively tailored ITO particles further comprises increasing to the (annealing) temperature over the time period of about 2.5 hours to about 4 hours. In some examples, annealing the reductively tailored ITO particles comprises increasing to the (annealing) temperature over the time period of about 2.5 hours to about 3.5 hours, about 2.5 hours to about 3 hours, about 3 hours to about 4 hours, or about 3 hours to about 3.5 hours, among other time periods.

In some examples, annealing the reductively tailored ITO particles comprises holding at the (annealing) temperature for about 0.5 to about 4 hours, about 0.5 hours to about 3.5 hours, about 0.5 hours to about 3 hours, about 0.5 hours to about 2.5 hours, about 0.5 hours to about 2 hours, or about 0.5 hours to about 1.5 hours, among other time periods.

In various examples, the non-oxidizing atmosphere can comprise any gas or mixture of gases that can form a non-oxidizing atmosphere. In some examples, the non-oxidizing atmosphere comprises nitrogen, argon, helium, xenon, krypton, a combination thereof.

In some examples, the method further comprises cooling the plurality of particles of ITO particles to about room temperature after annealing.

Various examples are directed to a plurality of particles comprising ITO particles produced by the methods described herein.

Further examples are directed to a composition comprising: a) a plurality of particles comprising TCO particles produced by the methods disclosed herein and b) a binder.

Figure 4:
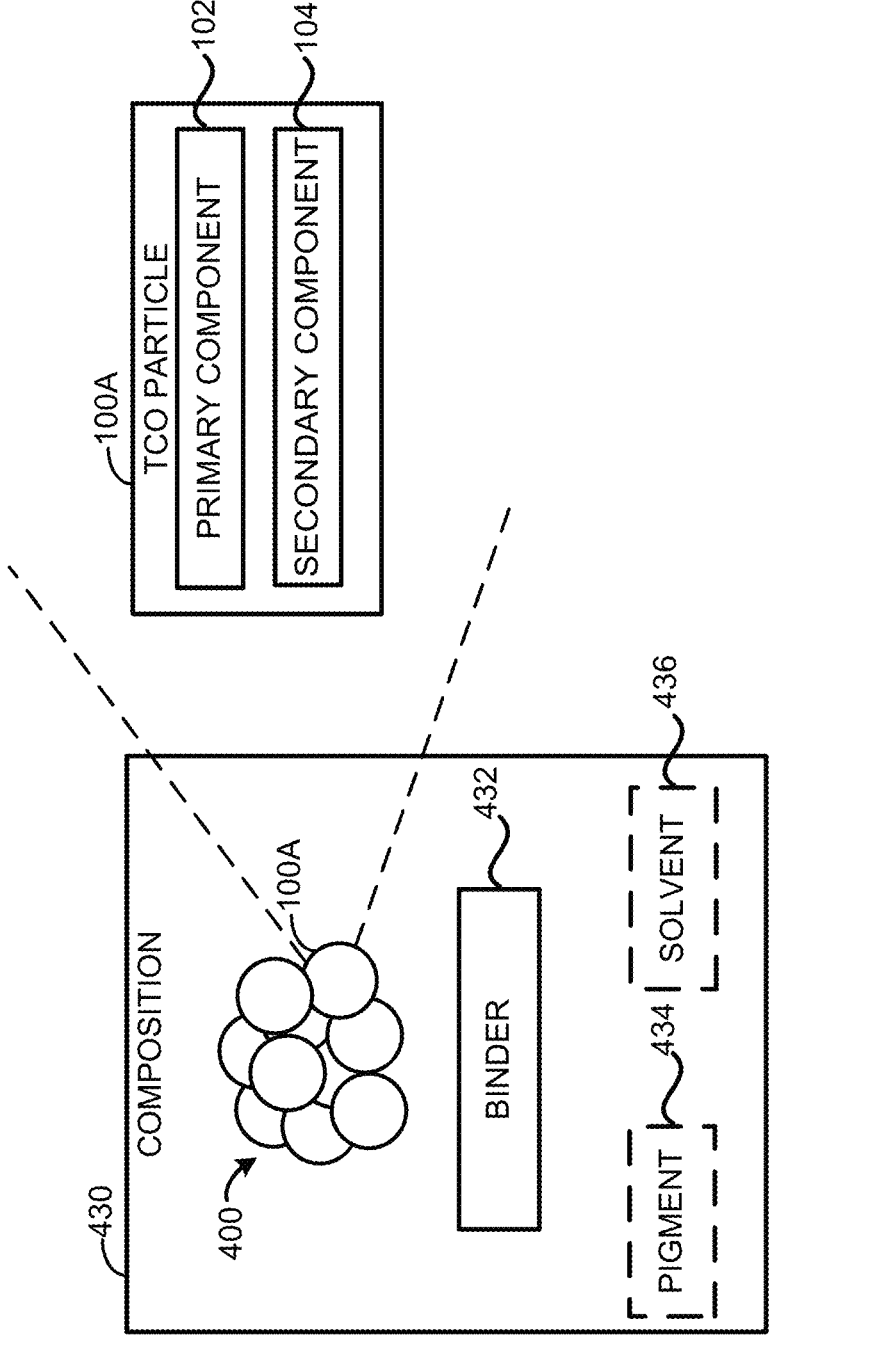
FIG. 4 illustrates an example composition including a plurality of particles, in accordance with various examples.

FIG. 4 illustrates an example composition including a plurality of particles, in accordance with various examples. As shown by FIG. 4, a composition 430 can comprise a plurality of TCO particles 400 and a binder 432. The TCO particles 400 may each include substantially the same features and attributes, and/or an implementation of plurality of particles 100 as previously described in connection with FIG. 1, as illustrated by the common numbering. The composition 430 can, for example, be a transparent paint, which can be used to create a transparent paint coating. Such a transparent paint coating can be used in autonomous vehicles. The incorporation of the TCO particles 400 disclosed herein into such compositions allows for increased reflectivity of signals, such as LIDAR signals. A transparent paint that reflects infrared light can enhance the signal detected by systems such as LIDAR sensors, regardless of the paint color or type used as the base coat underneath the transparent paint. For such example applications, compositions which can be tailored to be reflective in the infrared range, such as TCO materials, can be used in a transparent paint coating.

The TCO particles 400 can be TCO particles of any material as described herein. In some examples, the TCO particles 400 are selected from ITO particles, antimony tin oxide particles, fluorine tin oxide particles, aluminum zinc oxide particles, gallium zinc oxide particles, and indium zinc oxide particles, as well as combinations thereof. In some examples, the TCO particles 400 are ITO particles.

In various examples, the TCO particles 400 have a mean diameter of about 200 nm to about 500 nm in the particle size distribution, and a plasma wavelength of about less than 2000 nm. In various examples and as previously described, the TCO particles 400 comprise a primary component 102 and about 2 wt % to 20 wt % of a secondary component 104, as previously described and illustrated by the particular TCO particle 100A.

In some examples, the TCO particles 400 can have a median diameter from about 200 nm to about 500 nm, about 200 nm to about 450 nm, about 200 nm to about 400 nm, about 200 nm to 350 nm, about 200 nm to about 300 nm, about 200 nm to about 250 nm, about 250 nm to about 500 nm, about 250 nm to about 450 nm, about 250 nm to about 400 nm, about 250 nm to about 350 nm, about 250 nm to about 300 nm, about 200 nm to about 400 nm, or about 250 nm to about 350 nm in the particle size distribution, among other values.

The TCO particles 400 can comprise a wt % of about 2 wt % to about 20 wt %, about 5% to about 20%, about 6% to about 20%, about 8% to about 20%, about 10% to about 20%, about 12% to about 20%, about 14% to about 20%, about 15% to about 20%, about 17% to about 20%, about 5% to about 15%, about 5% to about 13%, about 5% to about 10%, about 10% to about 17%, about 10% to about 15%, about 8% to about 20%, about 10% to about 20%, about 10% to about 15%, about 2 wt % to 15 wt %, about 2 wt % to about 13 wt %, about 2 wt % to about 10 wt %, about 2 wt % to about 8 wt %, about 2 wt % to about 5 wt %, about 2 wt % to about 3 wt % of the secondary component 104, such as tin.

The TCO particles 400 can be reflective in the infrared wavelength range and exhibit dielectric properties in the visible wavelength range. As described previously herein, the infrared wavelength range is from about 750 nm to 1 mm in the electromagnetic spectrum.

As previously described, the TCO particles 400 can have a plasma wavelength of about less than 2000 nm, about less than 1900 nm, about less than 1800 nm, about less than 1700 nm, about less than 1600 nm, about less than 1500 nm, about less than 1400 nm, about less than 1300 nm, about less than 1200 nm, about less than 1100 nm, about less than 1000 nm, about less than 900 nm, or about less than 800 nm, among other wavelengths. In some examples, the TCO particles 400 can have a plasma wavelength of about 1500 nm to about 1550 nm, about 1450 nm to about 1500 nm, about 1400 nm to about 1450 nm, about 1350 nm to about 1400 nm, about 1300 nm to about 1350 nm, about 1250 nm to about 1300 nm, about 1200 nm to about 1250 nm, about 1150 nm to about 1200 nm, about 1000 nm to about 1150 nm, about 950 nm to about 1000 nm, about 900 nm to about 980 nm, about 900 to about 950 nm, about 850 nm to about 900 nm, about 800 nm to about 850 nm, or about 750 nm to about 800 nm, among other wavelength ranges.

In some examples, the TCO particles 400 have a refractive index of about 1.3 to about 2.2. In some examples, the TCO particles 400 have a refractive index of about 1.4 to about 1.6.

In some examples, the TCO particles 400 and the binder 432 have about the same refractive index. As used herein, "about the same refractive index" is defined as ±0.1 refractive index units. For example, if the refractive index of the TCO particles 400 is about 1.5, the refractive index of the binder 432 can be from about 1.4 to 1.6. The TCO particles 400 having about the same refractive index as the binder 432 allows for maximum transparency in the composition. Such a property is useful in, for example, the formulation of paint compositions for autonomous vehicles to minimize the amount of light absorption.

In some examples, the binder 432 is polyester, polyacrylic, polyurethane, polyacrylic urethane, and/or epoxy. A binder refers to or includes any component that holds particles (e.g., pigment particles and/or the TCO particles 400) together after removal of a solvent. For example, the binder 432 may form part of a paint composition, such as an acrylic paint. The solvent in a paint composition may dissolve all other component to create a liquid. As the paint dries, the solvent evaporates.

In some examples, the composition 430 can further comprise a pigment 434. The pigment 434 may be any pigment used in conventional paint compositions. In some examples, the pigment 434 is selected from a natural oxide, an artificial oxide, a metal salt, a metal power, and an organic pigment. Examples of appropriate pigments include, but are not limited to, titanium dioxide, zinc oxide, antimony oxide, aniline yellow, benzidine yellow, lead chromate, zinc chromate, iron oxide, cadmium sulfide, phthalocyanine green G, chromium oxide, copper phthalocyanine, prussian blue, ultramarine blue, toluidine red, arylamide red, carbon black, aluminum, and potassium alumino-silicate.

In some examples, the composition 430 further comprises a solvent 436. The solvent 436 can be any solvent utilized in conventional paint compositions. The solvent 436 can be, for example, selected from water, an aromatic hydrocarbon, an alcohol, a cellosolve, and an ester. Examples solvents include, but are not limited to, xylene, Solvesso 100, Solvesso 150, Solvesso 200, Tetralin, propylenglycolmethylether, butanol, butyl glycol, pine oil, butyl glycol, butyl glycolate, butyl cellosolve acetate, and butyl diglycol acetate.

In some examples, the plurality of TCO particles 400, such as ITO particles, comprises about 0.1 volume % to 1.0 volume % of the total composition volume.

Examples of the present disclosure are directed to particles, compositions, and methods of forming and/or using the particles and compositions. The particles are TCO particles having tailored physical, optical, and electrical properties due to the material used to form the particles, the size, and tailored reduction, among other factors. The particles may have a median diameter of about 200 nm to 500 nm and a plasma wavelength of about less than 2000 nm. The particles can be formed of a primary component and between about 2 wt % and 20 wt % of a secondary component. In various examples, the resulting particles reflect infrared wavelengths and are transparent at visible light wavelengths. Such particles may be used in a variety of different composition, including but not limited to paint coatings or other compositions.

EXPERIMENTAL EMBODIMENTS

The following examples are put forth so as to provide those of ordinary skill in the art with a complete disclosure and description of how the compounds, compositions, articles, devices, and/or methods described herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, solvents, solvent mixtures, temperatures, pressures and other reaction ranges and conditions that can be used to optimize the product purity and yield obtained from the described process. Only reasonable and routine experimentation will be required to optimize such process conditions.

Example 1 (Synthesis of Base TCO Particles)

A 0.1 M solution of indium trichloride was prepared by dissolving indium (III) $Cl_3$—$(H_2O)_4$ in water and a 0.1 M solution of tin tetrachloride by dissolving $SnCl_4$ in water. The indium solution (90 mL) and the tin solution (10 mL) for a 9:1 Molar ratio of In/Sn were added to a flask and stirred overnight (12 hours). Aqueous ammonium hydroxide (28%) was added dropwise until a pH of ~11 was reached and the stirred mixture was allowed to age for 24 hours. The slurry was centrifuged and washed with water four times and then dried at 65° C. overnight (12 hours). The mix was ground with motor and pestle and mixed with 40 mL of Polyethylene Glycol MW 400 and placed in a non-stirred Teflon hydrothermal reactor. The reactor was placed in an oven set at 240° C. for 48 hours. The product was then centrifuged and washed with ethanol 4× and dried at 65° C. overnight (12 hours) to produce the base ITO particles.

Example 2 (Synthesis of Reductively Tailored ITO Particles)

The base ITO particles as synthesized in Example 1 were subjected to reductive tailoring of the plasma frequency. The product was placed in a ceramic boat in a tube furnace and exposed to hydrogen gas using a 10% $H_2$/argon mixture supplied at ~50 mL/minute. The product was first purged for 1 hour and then the temperature in the furnace was ramped from room temperature to 300° C. over 1 hour and held at that temperature for 30 minutes and then the furnace was opened to rapidly cool the furnace.

After cooling, the sample was purged with argon for 1 hour and then heated from room temperature to 1100° C. over 3 hours and held at that temperature for 1 hour and allowed to cool in the furnace.

Example 3 (Infrared Studies for Reductively Tailored ITO Particles in a Film)

Figure 5:
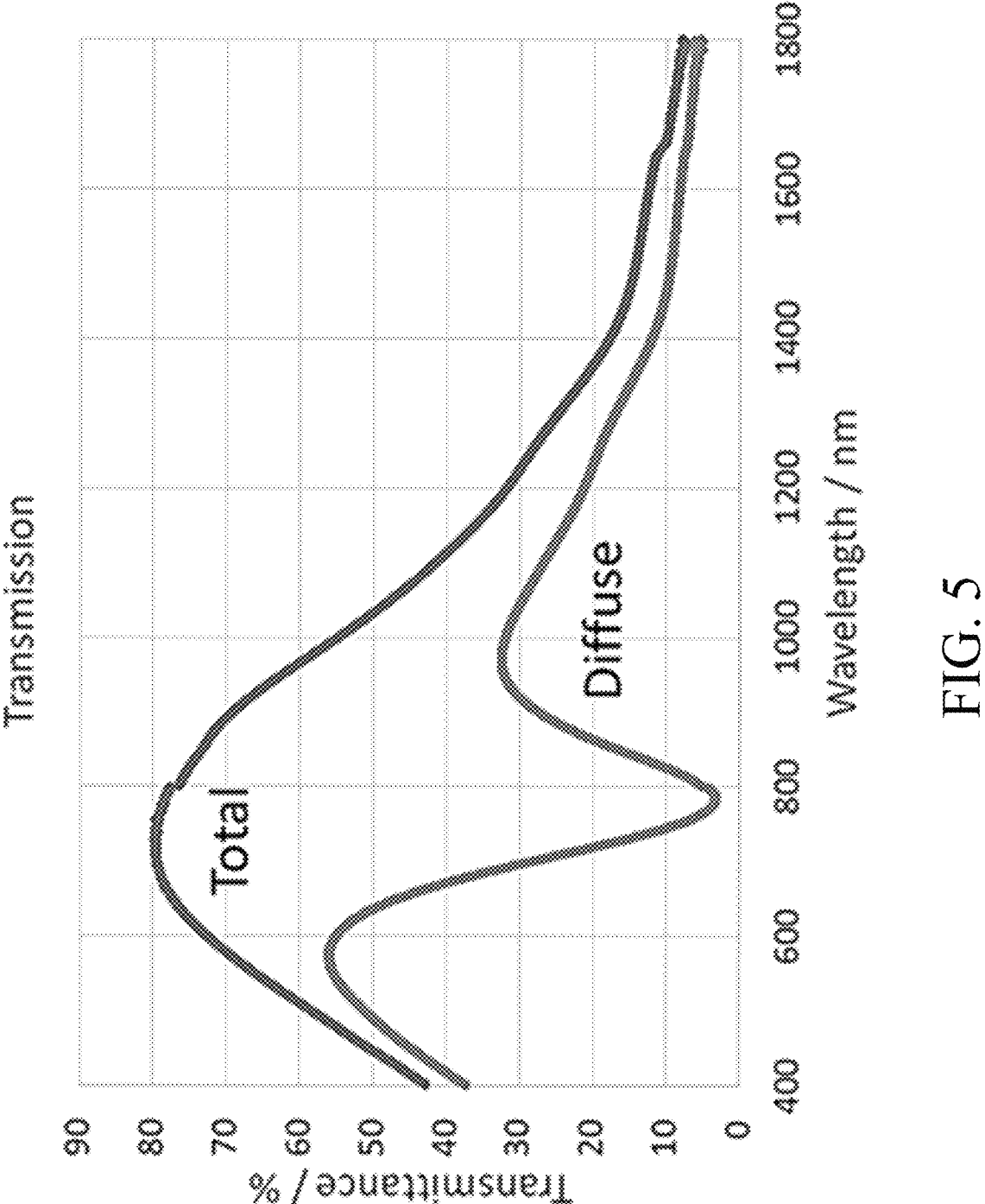
FIG. 5 is a representative infrared spectrum showing the percent transmittance for reductively tailored indium tin oxide particles.
Figure 6:
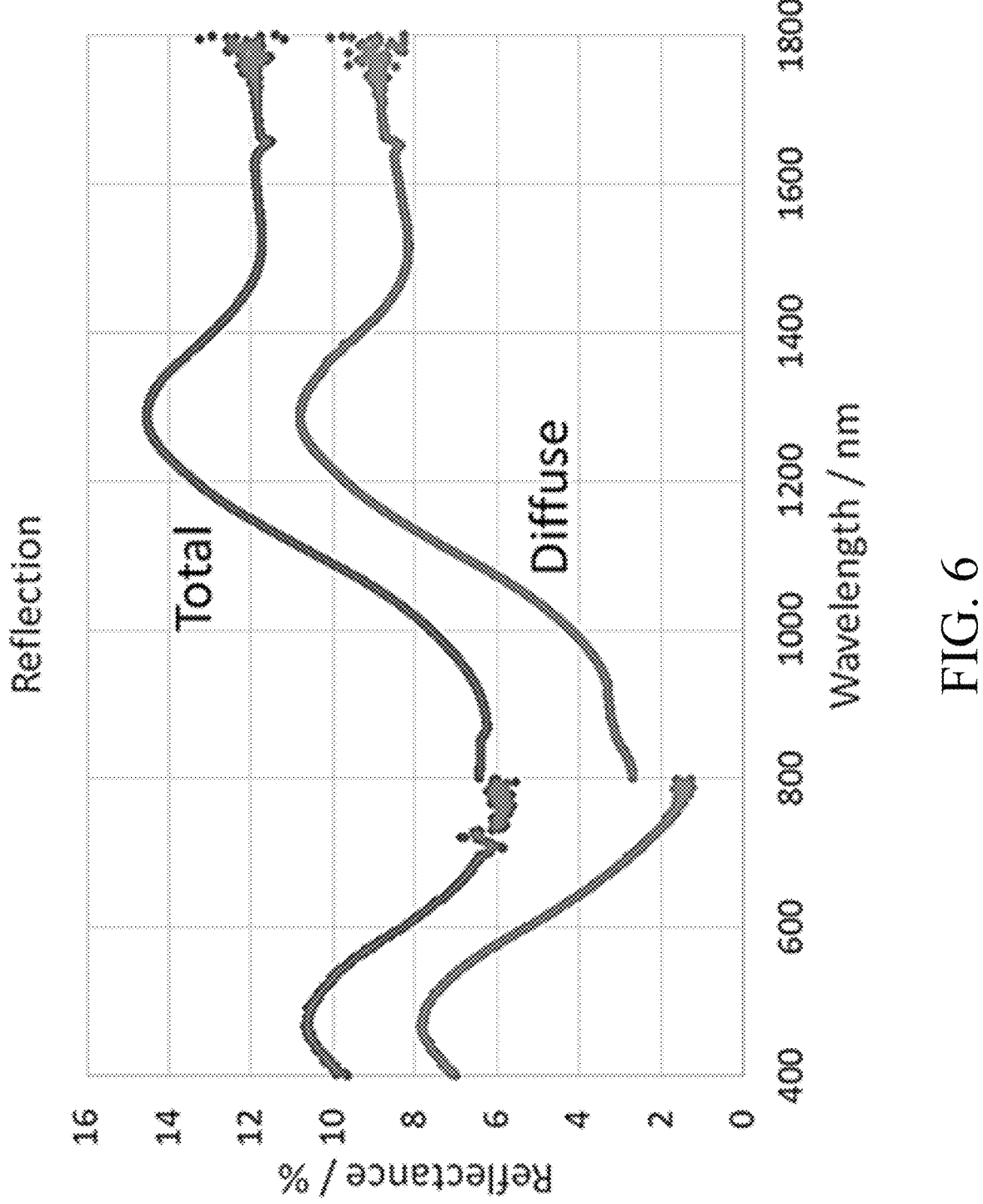
FIG. 6 is a representative infrared spectrum showing the percent reflectance for reductively tailored indium tin oxide particles.

The reductively tailored ITO particles were loaded at a weight percent of 10% in a polymethylmethacrylate binder. FIG. 5 shows representative transmittance data (both total and diffuse). FIG. 6 shows representative reflectance data (both total and diffuse). The results illustrated by FIGS. 5-6 are consistent with the particles having a plasma wavelength of 1066 nm.

Although specific examples have been illustrated and described herein, it will be appreciated by those of ordinary skill in the art that any arrangement that capable of achieving the same purpose may be substituted for the specific examples shown. Many adaptations of the examples will be apparent to those of ordinary skill in the art. Accordingly, this application is intended to cover any adaptations or variations of the examples.

The invention claimed is:

1. A plurality of particles comprising:
   transparent conductive oxide particles, wherein the transparent conductive oxide particles have:
      a median diameter of about 200 nanometers (nm) to about 500 nm in the particle size distribution; and
      a plasma wavelength of about less than 2000 nm, and
   wherein the transparent conductive oxide particles comprise:
      a primary component; and
      about 2 weight percent to about 20 weight percent of a secondary component, and
   wherein the transparent conductive oxide particles have a refractive index of about 1.3 to about 2.2.

2. The plurality of particles of claim 1, wherein:

the primary component comprises indium or zinc; and the secondary component comprises tin, aluminum, gallium, antimony, or fluorine.

3. The plurality of particles of claim 1, wherein the transparent conductive oxide particles are selected from:

indium tin oxide particles, antimony tin oxide particles, fluorine tin oxide particles, aluminum zinc oxide particles, gallium zinc oxide particles, indium zinc oxide particles, and a combination thereof.

4. The plurality of particles of claim 1, wherein the transparent conductive oxide particles are reflective in the infrared wavelength range and exhibit dielectric properties in the visible wavelength range.

5. The plurality of particles of claim 1, wherein the transparent conductive oxide particles have a plasma wavelength of about 1500 nm to about 1550 nm.

6. A method of producing a plurality of particles comprising transparent conductive oxide particles, the method comprising:

reacting base transparent conductive oxide particles with a reducing gas to produce reductively tailored transparent conductive oxide particles; and annealing the reductively tailored transparent conductive oxide particles in a non-oxidizing atmosphere at a temperature of about 700 degrees Celsius (C) to about 1300° C. to produce the plurality of particles comprising transparent conductive oxide particles, wherein the transparent conductive oxide particles have:

a median diameter of about 200 nanometers (nm) to about 500 nm in the particle size distribution;

a plasma wavelength of about less than 2000 nm; and a refractive index of about 1.3 to about 2.2; and wherein the transparent conductive oxide particles comprise:

a primary component; and about 2 weight percent to about 20 weight percent of a secondary component.

7. The method of claim 6, wherein the transparent conductive oxide particles are formed from a metal oxide including the primary component.

8. The method of claim 6, wherein the reducing gas comprises carbon monoxide, ammonia, hydrazine, $H_2$, or a combination thereof.

9. The method of claim 8, wherein the reducing gas further comprises an inert gas selected from nitrogen, argon, helium, xenon, krypton, and a combination thereof.

10. The method of claim 6, wherein reacting the base transparent conductive oxide particles with the reducing gas comprises removing oxygen using the reducing gas for about 20 minutes to about 3 hours.

11. The method of claim 6, wherein the base transparent conductive oxide particles are selected from:

indium tin oxide particles, antimony tin oxide particles, fluorine tin oxide particles, aluminum zinc oxide particles, gallium zinc oxide particles, indium zinc oxide particles, and a combination thereof.

12. The method of claim 6, wherein annealing the reductively tailored transparent conductive oxide particles comprises increasing from about room temperature to the temperature of about 700° C. to about 1300° C. and over a time period of about two hours to about five hours.

13. The method of claim 6, wherein annealing the reductively tailored transparent conductive oxide particles comprises holding at the temperature for about 0.5 hours to about 4 hours.

14. The method of claim 6, comprising annealing the transparent conductive oxide particles at the temperature of about 850° C. to about 1250° C.

15. A composition comprising:

a plurality of transparent conductive oxide particles, wherein the transparent conductive oxide particles have:

a mean diameter of about 200 nanometers (nm) to 500 nm in the particle size distribution; and a plasma wavelength of about less than 2000 nm, wherein the transparent conductive oxide particles comprise:

a primary component; and about 2 weight percent to about 20 weight percent of a secondary component, wherein the transparent conductive oxide particles have a refractive index of about 1.3 to about 2.2; and a binder.

16. The composition of claim 15, wherein the transparent conductive oxide particles are reflective in the infrared wavelength range and exhibit dielectric properties in the visible wavelength range.

17. The composition of claim 15, wherein the transparent conductive oxide particles and the binder have about the same refractive index.

18. The composition of claim 15, wherein the plurality of transparent conductive oxide particles comprise about 0.1 volume percent to 1.0 volume percent of a total composition volume.

\* \* \* \* \*